United States Patent [19]

Burditt et al.

[11] Patent Number: 5,308,395
[45] Date of Patent: May 3, 1994

[54] LIQUID COLORANT/ADDITIVE CONCENTRATE FOR INCORPORATION INTO PLASTICS

[75] Inventors: Neil A. Burditt, Shaker Heights; Richard L. Abrams, N. Royalton, both of Ohio

[73] Assignee: Ferro Corporation, Cleveland, Ohio

[21] Appl. No.: 878,358

[22] Filed: Jun. 4, 1992

Related U.S. Application Data

[60] Division of Ser. No. 686,033, Apr. 16, 1991, Pat. No. 5,157,067, which is a continuation-in-part of Ser. No. 545,350, Jun. 27, 1990, abandoned.

[51] Int. Cl.$^5$ .................. C08J 3/20; C08L 93/04
[52] U.S. Cl. ........................ 106/500; 524/270
[58] Field of Search .................. 106/500; 524/270

[56] References Cited

U.S. PATENT DOCUMENTS

| | | | |
|---|---|---|---|
| 3,912,677 | 10/1975 | Baker et al. | 260/27 R |
| 3,948,828 | 4/1976 | Becker et al. | 260/13 |
| 3,956,008 | 5/1976 | Knepper et al. | 106/308 B |
| 4,167,503 | 9/1979 | Cipriani | 260/33.2 R |
| 4,188,236 | 2/1980 | Robertson et al. | 106/308 Q |
| 4,301,055 | 11/1981 | Schefbauer | 260/33.6 R |
| 4,309,320 | 1/1982 | Arora et al. | 260/23 |
| 4,341,565 | 7/1982 | Martenson | 106/307 |
| 4,400,216 | 8/1983 | Arora | 106/23 |
| 4,415,705 | 11/1983 | Hutter | 525/167.5 |
| 4,444,714 | 4/1984 | Martenson | 264/328.18 |
| 4,571,416 | 2/1986 | Jarzombek et al. | 524/474 |
| 4,624,983 | 11/1986 | Jarzombek et al. | 524/474 |
| 4,634,471 | 1/1987 | Foye et al. | 106/262 |
| 4,639,272 | 1/1987 | Ito et al. | 106/243 |
| 4,859,247 | 8/1989 | Foye et al. | 106/505 |
| 4,859,728 | 8/1989 | Schneider et al. | 524/159 |
| 4,885,033 | 12/1989 | Blackburn et al. | 106/494 |
| 4,910,236 | 3/1990 | Foye et al. | 523/333 |
| 4,962,150 | 10/1990 | Allen | 524/602 |

OTHER PUBLICATIONS

JP57212274, Dec. 27, 1982, Low-Viscosity Emulsion Ink For Litho Printing, Yoshimoto Hidejirou et al. (Abstract).
Supplementary European Search Report, EP 91 91 3233.

*Primary Examiner*—Joseph L. Schofer
*Assistant Examiner*—Wu C. Cheng
*Attorney, Agent, or Firm*—Rankin, Hudak & Hill

[57] ABSTRACT

Liquid concentrates for incorporation into polymeric resins are described that are storage stable and resistant to settling or viscosity changes which comprise:
(I) a vehicle comprising:
   (A) at least one organic rosin material;
   (B) at least one surfactant; and
(II) at least one colorant or additive.

The liquid concentrates of the present invention have a body or consistency that allow them to readily flow by gravity and are further characterized by a substantially uniform viscosity. The liquid color concentrates of the present invention also are compatible with a wide variety of plastics and facilitate a reduction in processing deficiencies such as screw-slippage, water carry-over and uneven flow to the pump inlet.

8 Claims, 1 Drawing Sheet

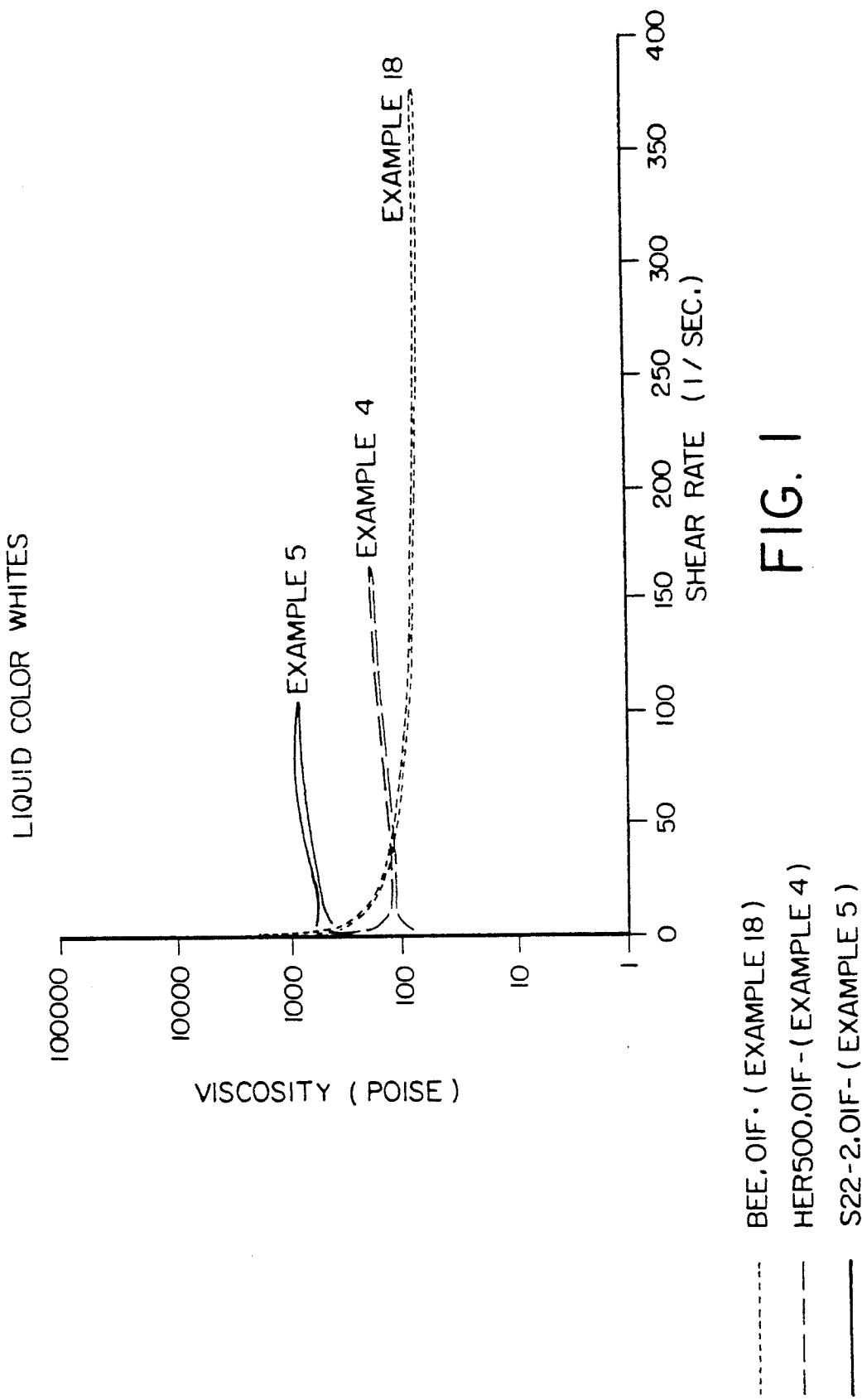

LIQUID COLORANT/ADDITIVE CONCENTRATE FOR INCORPORATION INTO PLASTICS

The present application is a divisional application of application Ser. No. 07/686,033, filed Apr. 16, 1991, which is a continuation-in-part of application Ser. No. 07/545,350, filed Jun. 27, 1990, now abandoned, which above applications are hereby fully incorporated by reference.

TECHNICAL FIELD

The invention pertains to the field of polymer additives and, more particularly, to methods for modifying polymeric resins and to liquid concentrates used in such methods. The invention is especially concerned with liquid colorant or additive concentrates and with the use of such concentrates in coloring or modifying is plastics.

BACKGROUND OF THE INVENTION

Traditionally, plastics have been colored by tumble blending the plastic with a solid colorant or additive concentrate such as a coloring powder. The blended material is then fed into an extruder or molding machine where the resin and the colorant are plasticized and the colorant is incorporated into the molten plastic.

However, this method has a number of drawbacks. In many cases, a solid colorant or additive concentrate does not uniformly mix with plastic, or it does not disperse uniformly during molding. Further, solid colorants often segregate from the plastic during pre-molding handling because of particle size or specific gravity differences.

In recent years, liquid color concentrates have been developed in an effort to overcome the disadvantages of the traditional solid colorants. Liquid color concentrates are dispersions of a colorant in a carrier vehicle. Being liquids, these colorant concentrates may be accurately metered directly into molding machines or extruders by in-line metering systems, which help overcome many of the disadvantages of solid colorants. They have been used to color thermoplastic resins such as polypropylene, acrylonitrile-butadiene-styrene (ABS), polystyrene, poly(ethylene terephthalate) (PET) and the like. However, liquid color concentrates sometimes lack uniformity and tend to settle or separate into layers after standing at ambient storage conditions.

Several prior art techniques have been developed in order to achieve uniform and storage stable liquid colorant concentrates. One prior art technique requires that vehicles for liquid color concentrates be primarily based on expensive surfactants and wetting agents. For example, U.S. Pat. Nos. 3,956,008 and 4,167,503 disclose colorants having surfactant based vehicles that provide an excellent pigment dispersion media and allow relatively high pigment loadings, at viscosities suitable for use in standard in-line metering equipment.

Although surfactant-based vehicles generally perform satisfactorily, they are subject to several drawbacks. First, the surface active agents used as dispersants are expensive, which can significantly add to the cost of coloring or modifying thermoplastic resins. Secondly, since the surfactants used in the vehicles are polar in nature and hygroscopic, the liquid color concentrates are often incompatible with certain plastics. This incompatibility can cause poor mixing in the molder or extruder, resulting in non-uniform color, such as specks of colorant or streaking of colorant. Thirdly, surfactant-based vehicles are often responsible for a decrease in output due to lubrication of the forming equipment, especially at high colorant loadings. For example, extrusion of PET is commonly adversely affected by standard liquid colorant concentrates through "screw slippage" in the molding machine or extruder. A further problem encountered with surfactant-based vehicles occurs in the extrusion of monoaxially oriented polypropylene. A phenomenon known as "water carryover" occurs when incompatible surfactants move to the surface of the plastic and, being hydrophilic, tend to hold water. This results in an unacceptable amount of water being carried over from the quenching water bath to the take-up equipment. Another problem known as exudation occurs when incompatible vehicles exude, or spew up, to the surface of the molded plastic. Finally, since the colorant and an inert filler such as fumed silica are generally used to control viscosity, this results in a concentrate that is thixotropic, i.e.—one which forms a gel that must be broken up before it can flow.

A second prior art technique developed to achieve uniform and storage stable colorant dispersions involves the use of vehicles not primarily based on surfactants. This technique focuses on thixotropy to maintain a stable dispersion of the colorant or additive. As noted above, a thixotropic concentrate is one which will not readily flow under gravity, but which thins to a very low viscosity on stirring or other application of shear.

U.S. Pat. Nos. 4,341,565 and 4,444,714 disclose stable liquid gel colorants that comprise a suspension of organic pigments in a liquid vehicle that is a plasticizer and which is gelled by an organophilic, expanding lattice clay that is ion exchanged with alkyl ammonium ions. The gel is modified by the addition of certain hydroxyalkyl fatty amines or fatty imidazolinium quaternaries.

U.S. Pat. No. 4,571,416 and 4,624,983 disclose liquid color and additive concentrates that are dispersions of a colorant and/or other additive in a non-surfactant based vehicle. The vehicle includes a low molecular weight addition polymer and an essentially non-volatile solvent for the low molecular weight addition polymer. The vehicle may also contain a dispersion aid, such as oleic acid, especially when the colorant is an inorganic pigment.

However, the non-surfactant based, thixotropic colorant concentrates are also subject to certain limitations. For example, the thixotropic concentrates, because of their initially high viscosity, may not flow evenly in a vessel to the pump inlet and are therefore often not readily pumpable for metering a given amount of the colorant concentrate into an extruder or molding machine.

Thus, liquid color concentrates available to plastic processors in the past have been inefficient, expensive, and not completely satisfactory from the standpoint of achieving color uniformity. Accordingly, there continues to be a need for liquid colorant/additive concentrates that are: (1) cost effective; (2) compatible with a wide variety of commercial thermoplastic resins; (3) suitable for use in conventional in-line metering and blending equipment; and (4) possess good shelf stability and uniformity.

U.S. Pat. No. 4,188,236 is directed to the production of a non-dusting pigment composition by contacting an aqueous dispersion of an organic pigment with (a) a solution or dispersion of an alkaline soluble rosin acid derivative;
(b) a sorbitan ester; and
(c) a water-insoluble organic carrier having a melting point below 100° C. at a temperature above the melting point of both the sorbitan ester and the organic carrier.

U.S. Pat. No. 4,415,705 is directed to high-solids pigment concentrates containing a dispersing agent formed by reacting a poly(lower alkylene)imine with a polyester comprising the reaction product of hydroxystearic acid, or its oligomer, with tall oil rosin. The patent describes a black pigment concentrate that includes about 4.8 parts by weight of a maleic-modified pentaerythritol ester of rosin which is reported to have a Brookfield viscosity of 282 poise initially and 368 poise after three days aging. The concentrate is reported to flow readily by gravity and can be handled by pumps commonly used in the art.

SUMMARY OF THE INVENTION

The invention pertains to liquid concentrates that are storage stable And resistant to settling or viscosity changes which comprise:
(I) a vehicle comprising:
  (A) at least about 15% by weight of at least one organic rosin material;
  (B) at least one surfactant; and
(II) at least one colorant or additive.

The liquid concentrates of the present invention have a body or consistency that allow them to readily flow by gravity and are further characterized by a substantially uniform viscosity. The liquid concentrates of the present invention also are compatible with a wide variety of plastics and facilitate a reduction in processing deficiencies such as screw-slippage, water carry-over and uneven flow to the pump inlet.

BRIEF DESCRIPTION OF THE DRAWING

FIG. 1 is a graphic representation of variations in the log viscosity vs. shear rate for various $TiO_2$ liquid concentrates.

DETAILED DESCRIPTION

In one of its aspects, the present invention is directed to liquid color concentrates comprising:
(I) a vehicle comprising:
  (A) at least about 15 percent by weight of the vehicle of at least one organic rosin material;
  (B) at least about 0.1 percent by weight of the total concentrate of a surfactant;
(II) up to about 85 percent based on the weight of the total concentrate of at least one colorant or additive.

The liquid colorant or additive concentrates of the present invention have a substantially uniform viscosity and are characterized by reduced thixotropy. The viscosity of the liquid concentrates of the invention is usually about 5 to about 1500 poise at 25° C. under a shear stress of 12.5 thousand dynes/cm². The liquid color concentrates of the present invention often possess "length", will flow readily under gravity and can be slightly dilatant at high loadings of colorant or additive.

The terms "reduced thixotropy" and "substantially uniform viscosity", when used in conjunction with the liquid concentrates of the present invention, denote a material having a viscosity of no more than about 1500 poise at 0 shear stress and wherein said viscosity changes no more than about an order of magnitude when the shear stress is increased to about 12.5 thousand dynes/cm². For example, a material having an initial viscosity of 1500 poise and a viscosity under shear stress of about 150 poise would be considered to have a substantially uniform viscosity with reduced thixotropy.

Length is a property of a material whereby it can be stretched out into a long thread without breaking such as, for example, honey. In contrast, thixotropic materials tend to be "short", i.e. —they have little or no flowing properties and tend to gel or bunch up. The liquid concentrates of the invention are preferably formulated to possess length.

When the liquid concentrates of the present invention are characterized as flowing readily under gravity it is to be understood that a 200 ml beaker filled with the liquid concentrate would deliver at least 90 percent of its contents within five minutes when inverted.

When the liquid concentrates of the invention are characterized as being slightly dilatant at high loadings of colorant or additive (e.g., greater than about 70% by weight of the concentrate) it is to be understood that the slope of the plot of viscosity (poise) vs. shear rate $(sec^{-1})$ of such materials will show an increase of up to about 600 poise as shear rate increases from about 5 to about 100 $(sec^{-1})$.

The liquid concentrates of the present invention employ primarily nonaqueous, rosin based vehicles. In one embodiment, the liquid concentrates of the present invention are substantially free of water (i.e. less than about 0.01% by weight of the total concentrate).

Vehicle (I)

ORGANIC ROSIN MATERIALS (A)

The organic rosin materials (A) of the vehicle system are known in the art and are available from a variety of commercial sources. Such materials are based upon or derived from gum, wood and/or tall oil rosins which are mainly a mixture of fused-ring, monocarboxylic acids typified by levopimaric acid, abietic acid and isomers thereof with the empirical formula $C_{19}H_{29}COOH$. Other acids such as dihydroabietic acid $(C_{19}H_{31}COOH)$ and dehydroabietic acid $(C_{19}H_{27}COOH)$ may also be present in the rosin materials (A). The rosin materials (A) also include non-polymeric derivatives of rosin acids such as esters, addition salts, hydrogenates, reduction products and the like. Suitable rosin materials generally have viscosity of 10 to about 500 poise at 25° C. and are either liquid at 25° C. or have a softening point (Hercules drop method) of from about 25° C. up to about 200° C. and, more often, from about 25° C. up to about 80° C.. The organic rosin materials (A) generally have an acid number from 0 to about 180 and, more often, from about 5 to about 50.

Representative examples of rosin materials useful in component (A) include those based upon: esters derived from rosin, consisting in main part of pimaric-type acid esters and/or abietic acid esters, including lower alkyl esters such as methyl, ethyl, propyl, butyl, and the like, glycerol esters, pentaerythritol esters, triethylene glycol esters, phthalate esters, and the like, and their hydrogenates and/or reduction products. Specific examples of commercially available materials useful as component (A) include:

TABLE I

| Rosin material (A) | Acid No. | Softening point °C. | Chemical description | Vendor |
| --- | --- | --- | --- | --- |
| Wood rosin | 160 | 78 | 90% abietic and/or pimaric-type acids and/or isomers thereof | Hercules |
| Abalyn | 6 | Liquid | Methylester of wood rosin | " |
| Hercolyn D | 6 | Liquid | Partial hydrogenate of Abalyn | " |
| Abitol | <1 | Liquid | Partial reductate/hydrogenate of Hercolyn D (dehydroabietyl alcohol) | " |
| Cellolyn 21 | 8 | 63 | Phthalate ester of Abitol | " |
| Ester gum | 6 | 90 | Glycerol ester of wood rosin | " |
| Pentalyn A | 12 | 111 | Pentaerythritol ester of wood rosin | " |
| Staybelite | 160 | 75 | Partial hydrogenate (50% $H_2$) of wood rosin | " |
| Foral AX | 160 | 75 | Partial hydrogenate (65% $H_2$) of wood rosin | " |
| Staybelite ester 3 | 7 | Liquid | Triethylene glycol ester of Staybelite | " |
| Staybelite ester 10 | 8 | 83 | Glycerol ester of Staybelite | " |
| Pentalyn H | 12 | 104 | Pentaerythritol ester of Staybelite | " |
| Foral 85 | 9 | 82 | Glycerol ester of Foral AX | " |
| Foral 105 | 12 | 104 | Pentaerythritol ester of Foral AX | " |
| Poly-Pale Resin | 144 | 102 | 90% abietic and/or pimaric-type acids and/or isomers thereof | " |
| Poly-Pale 10 ester | 7 | 114 | Glycerol ester of Poly-Pale resin | " |
| Pentalyn C | 14 | 133 | Pentaerythritol ester of Poly-Pale resin | " |
| 861 resin | 165 | 75 | Vacuum distillate of Poly-Pale resin | " |
| Pentalyn 344 | 10 | 108 | Pentaerythritol ester of 861 resin | " |
| Dymerex | 140 | 148 | Vacuum distillate of Poly-Pale resin | " |
| Pentalyn K | 13 | 191 | Pentaerythritol ester of Dymerex | " |
| Hercoflex 400 | | | | " |
| Hercoflex 500 | | | | " |
| Pentrex G | | | | " |
| Synthe copal rosin ester | | | | Reichold |

The vehicle of the liquid concentrate comprises at least about 15 percent by weight based on the weight of vehicle (I) of organic rosin material (A) and may comprise up to about 99.9 percent by weight based on the weight of the vehicle (I) of rosin material (A). In one embodiment, the organic rosin material (A) is present in the concentrate in an amount from about 10% to about 70% by weight of the total concentrate.

SURFACTANTS (B)

The liquid color concentrates of the present invention also contain at least one surfactant (B) capable of producing a dispersion of the colorant or additive (II). The surfactant (B) is employed in an amount sufficient to wet the colorant and/or additives and to reduce thixotropy. Surfactants which are nonionic, cationic, anionic, or amphoteric in nature may be used so long as liquid colorants can be produced with high loadings of colorants or additives and good particle dispersion at surfactant concentrations of no more than about 22% by weight of the total concentrate. In one embodiment, the surfactants are employed within the range of about 0.1% to about 10% by weight of the total concentrate and, more often, from about 1% to about 5% by weight of the total concentrate. At concentrations higher than about 22 wt. %, there is a significant reduction in cost-performance.

The surfactant (B) is generally selected based upon the particular colorants and/or additives used in the concentrate. This is because different colorants and additives have different surfactant demands. In general, a particular colorant's or additive's surfactant demand is met at the point wherein a sharp viscosity change (i.e., a difference of at least 100 fold) occurs during preparation of the concentrate. For the purposes of the present invention, when more than about 20 percent by weight (based on the concentrate) of surfactant is required to meet such a demand, this indicates that the surfactant does not have suitable activity.

Suitable surfactants may be selected for inorganic colorants or additives using the following screening procedure:
(1) Dissolve about 1.5 percent by weight of the candidate surfactant in a mineral oil such as White Oil 7-NF;
(2) Add about 50 percent by weight of the desired inorganic colorant or additive under stirring until some signs of thixotropy appear;
(3) Place the dispersion in a mixer at about an impeller tip speed of 5,000–6,000 feet per minute for 2 to about 5 minutes and observe the viscosity;
(4) If the viscosity observed in (3) is lower than about 500 poise, additional pigment, up to about 82 percent by weight of the total composition, may be added. If the resultant dispersion becomes thixotropic, the surfactant, although inadequate for high loadings, is adequate for low pigment loadings. If the dispersion remains flowable, the surfactant will be suitable for high pigment loadings;
(5) If the viscosity observed in (3) is thixotropic, the surfactant composition is adjusted up to about 5.0 percent by weight. If the thixotropy persists, the surfactant is considered unsuitable. If the thixotropy breaks, the surfactant will be suitable for low pigment loadings.
(6) Successful surfactants are tested at lower levels (between about 0.5 to about 10 wt %), using a 1:1 mixture of a rosin material (A) such as Hercoflex 500 and mineral oil and up to about 804 by weight of the colorant or additive. Surfactant level is adjusted until a suitable dispersion having the lowest amount of surfactant is found.

Suitable surfactants for organic colorants or additives may be selected by using a similar screening procedure. However, since a mixer is not always efficient in dispersing organic colorants and additives, a three-roll mill may be required. This breaks up fine agglomerates, and exposes much more of the colorant or additive surface to the vehicle. About 5-10 wt. % of the candidate surfactant is dissolved in mineral oil. About 40 wt. % of the desired organic colorant or additive is then added. Poor surfactants will produce gels (i.e., become thixotropic) at low levels of organic pigments, even under stirring conditions. Such surfactants are generally unsuitable for the purposes of the invention. The samples which do not gel under stirring conditions are passed over a three-roll mill. At the 40 wt. % level, certain organic colorants or additives will produce some thixotropy from the mill. If this occurs, the surfactant level is adjusted until the thixotropy "breaks" (i.e., a viscosity change or difference of at least 100 fold), and the mix flows in a nearly Newtonian fashion. This indicates that the surfactant demand has been met. If the surfactant demand is met by less than about 40 wt %, the candidate surfactant is considered suitable for use in the present invention. A fresh batch is then made up with the final formula, and milled to verify. Also, because of the extra complexity of the three-roll mill, the screening may be done with a 1:1 rosin material (A) (e.g., Hercoflex 500)/mineral oil mix.

A particularly suitable class of surfactants (B) useful in the practice of the present invention are those based upon polyesters of hydroxy carboxylic acids of the general formula HO-R-COOH where R is a divalent hydrocarbon group having at least about 8 carbon atoms; and polyesters prepared from mixtures of such hydroxy carboxylic acids with a carboxylic acid that is free from hydroxy groups. Representative examples of such hydroxy carboxylic acids include ricinoleic acid, mixtures of 9- and 10-hydroxystearic acid and 12-hydroxystearic acid (HSA). Representative examples of carboxylic acids that are free of hydroxy groups are lauric acid, palmitic acid, stearic acid and oleic acid. Mixtures of 9- and 10-hydroxystearic acid can be obtained by sulphonation of oleic acid followed by hydrolysis. Sources for 12-hydroxystearic acid include commercially available hydrogenated castor oil fatty acid which contains minor amounts of stearic acid and palmitic acid. Representative examples of suitable polyester surfactants include:

1. Poly-(12-hydroxystearic acid) surfactants of the structure:

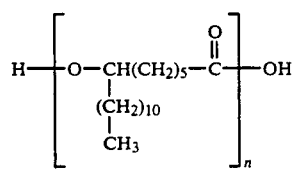

wherein (n) represents the degree of polymerization and is usually from about 7 to about 12. In addition to the 12-hydroxystearic acid, such surfactants may contain a lower level of stearic acid. Also, some of the hydroxy endgroups of such poly(12-hydroxystearic acid) surfactants may be capped with regular stearic acid which has no 12-hydroxy group. A specific example of a suitable poly(12-HSA) surfactant is Hypermer ® LP-1 from ICI which has a degree of polymerization (n) of about 9.

2. Derivatives of polyester surfactants wherein at least a portion of the acid endgroups are amidized. The polyester surfactants can be amidized with, for example, N,N-dimethyl-1,3-propanediamine to form the following endgroups:

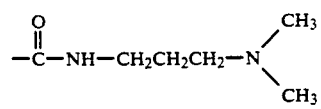

A specific example of a suitable amidized polyester is a poly(12-HSA) surfactant wherein about two-thirds of the acid endgroups are amidized with N, N-dimethyl-1,3-propanediamine such as Hypermer ® LP-4 from ICI.

3. A surfactant obtained from the reaction of a poly(-lower alkylene)imine with a polyester. Such adducts are described, for example, in U.S. Pat. No. 4,224,212, which is fully incorporated by reference herein. For example, adducts of poly(12-hydroxystearic acid) and polyethylene imine (PEI) which are formed via both amide and carboxylic acid-amine salt linkages between the carboxylic acid endgroups of the poly(12-HSA) and the amino groups of the PEI have been found to be particularly suitable. The PEI used in preparing such adducts is usually a polyfunctional, randomly branched polymeric amine which contains both primary and secondary amino groups capable of forming amide and salt linkages. A specific example of a suitable poly(12-HSA)-PEI adduct is Hypermer ® LP-6 from ICI.

Examples of particular surfactant-additive/colorant combinations useful in the practice of the present invention include:

| Inorganic Colorants | |
|---|---|
| Colorant | Surfactants |
| TiO$_2$ | Hypermer ® LP-1 or LP-4 |
| Red Iron Oxide | Hypermer ® LP-4 |
| Coated Lead Chromate | Hypermer ® LP-4 |
| Ultramarine Blue | Hypermer ® LP-4 |
| Mercadium Orange | Hypermer ® LP-4 |
| Carbon Black | Hypermer ® LP-6 |
| Organic Colorants and Additives | |
| Colorant/Additive | Surfactant |
| Azodicarbonamide | Hypermer ® LP-6 |
| Phthalocyanine Blue | Hypermer ® LP-6 |
| Quinacridones | Hypermer ® LP-6 |
| Specialty Azo Reds | Hypermer ® LP-6 |

ORGANIC DILUENT (C)

In addition to the above components, it is often necessary that the vehicle portion (I) of the liquid concentrate contain from about 0 to about 80% by weight of a low viscosity organic diluent. As used in conjunction with diluent (C), the term "low viscosity" does not necessarily refer to any particular viscosity range, but is intended to define a material of lower viscosity relative to the more viscous organic rosin based component. The viscosity of (C) is generally below about 10 poise at 25° C. The diluent (C) must be capable of thinning the viscous component (A) at a concentration which will result in a colorant concentrate having the aforementioned properties. Specifically, the organic diluent (C) may comprise from zero to about 80 wt. % of the vehicle (I). Also, suitable diluents are preferably inert to the other components, and have low color, odor, and reactivity at molding or extrusion temperatures.

Examples of such materials include: Mineral oils such as White Oil 7-NF (Technical Products, Inc., Chicago), and the like; mineral spirits such as Odorless Mineral Spirits from Chem Central, and the like; and low molecular weight (below about 1000) polybutenes such as Amoco Indopol L-14 and the like; and admixtures of one or more of such materials.

Colorants and/or Additives (II)

The term "colorant" when used throughout this specification and in the appended claims, denotes any conventional inorganic or organic pigment, organic dyestuff, or carbon black. Those skilled in the art will be aware of suitable inorganic pigments, organic pigments and dyestuffs useful in component (II). Such materials are described, for example, in *Kirk-Othmer Encyclopedia of Chemical Technology*, Third Edition, vol. 6, pp. 597–617 which is incorporated by reference herein; examples are:

(1) inorganic types such as titanium dioxide, carbon black, iron oxide, zinc chromate, cadmium sulfides, chromium oxides, sodium aluminum silicate complexes, such as ultramarine pigments, metal flakes and the like; and (2) organic types such as azo and diazo pigments, phthalocyanines, quinacridone pigments, perylene pigments, isoindolinone, anthraquinones, thioindigo, solvent dyes and the like.

Although principally employed for the preparation of liquid colorant concentrates, the vehicle (I) should also be suitable for the production of multi-functional dispersions that combine a colorant with one or more standard additives. Also, non-pigmented additive concentrates which combine one or more additives are contemplated by the present invention. These additives may include UV stabilizers or absorbers, antioxidants, fire retardants, blowing agents, antistats, lubricants, impact modifiers, mold release agents, filler/reinforcing materials (e.g., calcium carbonates), or mixture of two or more of these ingredients. In this way, a single system can impart multiple functional properties to the thermoplastics treated. Hence, unless specifically excluded, when the term colorant is employed for the purpose of describing the concentrate of this invention, it contemplates also additives in general.

Preparation of the colorant concentrates of the invention can be by any of a number of methods known in the art including those set forth in Patton, Paint Flow and Pigment Dispersion, John Wiley and Sons (1979) and Weber, ed., coloring of Plastics, SPE Monographs, John Wiley and Sons (1979) which are incorporated by reference herein. In one aspect, the concentrates of the invention are prepared by dissolving the surfactant component (B) in the viscous material (A) at a temperature below about 150°, and usually ambient temperature, in a high speed disperser, such as a high speed rotary mixer (e.g. Cowles Dissolver), three roll mill, media mill (sand mill, shot mill, ball mill, etc.) such as those manufactured by Premier Mill. If a diluent (C) is to be employed, it is usually added to the vehicle system at this point. After the surfactant is completely dissolved and the vehicle is homogeneous, the colorant is gradually added under agitation and the mixture is dispersed at high speed until a uniform, stable dispersion is achieved.

In another aspect, the present invention relates to methods of coloring or modifying polymeric resins. The liquid colorant concentrates of this invention are added to the polymeric resin to be colored or modified in amounts up to about 10%, preferably up to about 5%, based on the weight of the resin. The amount used is often referred to as the "letdown" or "letdown ratio" and is normally dependent on the color intensity desired or required level of additive. Also, admixtures of one or more concentrates may be employed to vary the color or other properties of the resin.

A polymeric resin may be modified or colored by the liquid color concentrates of the present invention by intimate mixing. "Intimate" mixing means that the mixture is prepared with sufficient mechanical shear and thermal energy to produce a dispersed phase which is finely divided and homogeneously dispersed in the continuous or principal phase. For example, a particularly useful procedure is to intimately mix the polymeric resin with one or more colorant concentrates using conventional mixing equipment such as a mill, a Banbury mixer, a Brabender torque rheometer, a single or twin screw extruder, continuous mixers, kneaders, etc. The polymers may be intimately mixed in the form of granules, pellets, and/or powder in a high shear mixer. One preferred process for coloring and/or modifying polymeric resins according to the invention utilizes an in-line metering system for direct incorporation of the concentrate into a polymer resin at the extruder or molding machine. The colorant concentrates may be added in measured amounts to the polymeric resin either by tumbling with the resin or by pumping the concentrate into the feed throat of a plastic machine or preferably metering into the polymer's melt stream.

The concentrates of the present invention may be used to color or incorporate additives into a wide variety of polymeric resins and find equal application in modification of both thermoplastic and thermoset resins. For example, the color concentrates of the invention are generally compatible with, and may be used with the following resins: polyolefins such as LLDPE, HDPE, LDPE, homopolymer and copolymer polypropylenes, EVA, etc.; styrenics such as crystal polystyrene, HIPS, MIPS, etc.; copolymer resins, resin blends and alloys such as ABS, polyphenylene ether (including PPO blends such as NORYL ®), various engineering polymer alloys; polyamide resins, such as Nylon 6, 6/6, 11, 12, copolymers, terpolymers, etc.; acrylic resins, polycarbonates, and other amorphous resins; polyesters, such as PET, PBT, and others—both thermoplastic and curing, as well as resins reinforced with glass, quartz, carbon, aramid, or the like, fibers.

EXAMPLES

In order that those skilled in the art will be better able to practice the invention, the following examples are given by way of illustration and not by way of limitation. Unless otherwise noted, all percentages are by weight of the total composition. All temperatures, if not specified, are ambient temperature. Mineral oil, when referred to herein denotes White Oil 7-NF (Technical Products, Inc., Chicago).

1. Surfactant Screening

Example 1

The following formula is made to evaluate Byk Anti-Terra 207, a candidate surfactant:

| Raven 1170 Carbon Black | 30% |
| Mineral oil | 60% |
| Byk Chemie Anti-Terra 207 | 10% |

The mineral oil and surfactant were mixed at low rpms on the high-speed disperser, then the pigment was added gradually under agitation.

After mixing with a high-speed disperser at moderate rpms (under 3000), the mix was a stiff paste. Ten more grams of the surfactant were added, and it was agitated again. The mix remained a stiff paste. Since other candidate materials had produced a fluid mixture under the same conditions, the surfactant was not considered suitable for carbon black in this system.

Example 2

The surfactant of Example 1 is evaluated for Titanium Dioxide dispersions, using the following formula:

| | |
|---|---|
| Kerr-McGee CR-834 TiO$_2$ | 70% |
| Mineral oil | 28% |
| Byk Chemie Anti-Terra 207 | 2% |

The mineral oil and surfactant were mixed at low rpms on the high-speed disperser, then the pigment was added gradually under agitation.

This mixture produced a stiff paste under agitation by the high-speed disperser. A further addition of 2% of the surfactant did not produce a free-flowing liquid. Since other candidate materials had produced a free-flowing liquid at 1% or less concentration, the material was not considered a successful candidate.

Example 3

The following mixture was prepared:

| | |
|---|---|
| Raven 1170 Carbon Black | 30% |
| Mineral oil | 60% |
| Ethoxylated Sorbitan Trioleate | 10% |

The mineral oil and surfactant were mixed at low rpms on the high-speed disperser, then the pigment was added gradually under agitation.

The mixture produced a thick paste under agitation at low, then high rpms on a high-speed disperser. Ten percent more surfactant was added, and the mix became free-flowing. Although the mixture became a soft paste on milling, the candidate material was considered to have passed the initial screening.

2. Sample Preparation

All samples of colorant concentrate are prepared using a rotary mixer, capable of 20,000 rpm—a one-horsepower Laboratory Dispersator from Premier Mill. The surfactant and all or, in some cases, a portion of the liquid ingredients are first premixed. The colorant is gradually added under constant stirring until all colorant is in the batch. The mixer is then turned up to produce a smooth vortex, then run at that speed for five minutes.

Example 4

A liquid colorant concentrate is prepared from:

| | |
|---|---|
| CR-834 Titanium Dioxide | 70% |
| Hypermer LP-1 | 1.5% |
| Hercoflex 500 | 28.5% |

The concentrate has a viscosity of about 300 to 500 Poise, and is somewhat dilatant.

Example 5

A liquid colorant concentrate is prepared from:

| | |
|---|---|
| CR-834 Titanium Dioxide | 80% |
| Hypermer LP-1 | 1.33% |
| Hercoflex 500 | 13.33% |
| Mineral Oil | 5.34% |

The concentrate has a viscosity of about 750 to 865 Poise, and is somewhat dilatant.

Example 6

A liquid additive concentrate is prepared from:

| | |
|---|---|
| Kempore 200 (Olin) Azodicarbonamide (blowing agent) | 46.9% |
| Indopol L-14 Polybutene | 9.1% |
| Mineral Spirits | 9.1% |
| Sorbitan Trioleate (ethoxylated) | 1.0% |
| Abalyn Rosin | 33.9% |

Example 7

A liquid color concentrate is prepared from:

| | |
|---|---|
| Mapico 297 Iron Oxide | 75.0% |
| Hercoflex 500 | 17.2% |
| Mineral Oil | 7.3% |
| Hypermer LP-4 | 0.5% |

Example 8

A liquid color concentrate is prepared from:

| | |
|---|---|
| Monastral Red Y Quinacridone | 46.2% |
| Hercoflex 500 | 28.1% |
| Mineral Oil | 16.5% |
| Hypermer LP-6 | 9.2% |

Example 9

A liquid color concentrate is prepared from:

| | |
|---|---|
| Ultramarine Blue 5151 | 50.0% |
| Hercoflex 500 | 43.4% |
| Mineral Oil | 4.6% |
| Hypermer LP-4 | 2.0% |

Example 10

A liquid color concentrate is prepared from:

| | |
|---|---|
| Monarch 120 Carbon Black | 42.9% |
| Hercoflex 500 | 36.1% |
| Mineral Oil | 15.4% |
| Hypermer LP-6 | 5.6% |

Example 11

A liquid color concentrate is prepared from:

| | |
|---|---|
| RFC-6 Titanium Dioxide | 70.0% |

-continued

| (Tioxide Canada) | |
|---|---|
| Calcium Carbonate | 13.5% |
| Hercoflex 500 | 10.5% |
| Mineral Oil | 4.5% |
| Tinting Pigments | 0.6% |
| Hypermer LP-4 | 0.9% |

Example 12

A liquid additive concentrate is prepared from:

| Kempore 200 blowing agent | 66.7% |
|---|---|
| Hercoflex 500 | 21.0% |
| Mineral oil | 9.0% |
| Hypermer LP-6 | 3.3% |

The viscosity of this material ranged from 500 to 1400 poise, and flowed readily under gravity.

Example 13

A liquid additive concentrate is prepared from:

| Kempore 200 blowing agent | 50.0% |
|---|---|
| Hercoflex 500 | 33.25% |
| Mineral oil | 14.25% |
| Hypermer LP-6 | 2.50% |

The viscosity of this material ranged from 26 to 65 poise, and it flowed readily.

Example 14

A liquid concentrate is prepared from:

| RFC-6 Titanium Dioxide (Tioxide Canada) | 62.36% |
|---|---|
| Columbian Chemicals Mapico TAN 20 (magnesium ferrite) | 0.79% |
| Hercoflex 500 | 20.3% |
| Hypermer LP-4 | 1.0% |
| Mineral Oil | 8.7% |
| Calcium Carbonate | 5.3% |
| Dispersion of Example 9 | 1.55% |

Example 15

| Methyl Ester of Rosin | 65.84% |
|---|---|
| Hypermer LP-4 | 1.50% |
| Hypermer LP-6 | 0.15% |
| Glycerol Mono-oleate | 5.00% |
| Titanium Dioxide White | 0.67% |
| Coated Lead Molybdate Orange | 2.67% |
| Magnesium Ferrite Tan | 21.34% |
| C.I. Solvent Yellow 93 | 2.33% |
| Carbon Black | 0.50% |

The above brown coloring material was mixed on a high-speed disperser and passed over a three-roll mill. It was then molded in High Impact Polystyrene on a production injection molding machine with a letdown of 1.6%. The part was free of the streaks which had been common with other coloring methods on the same tooling.

Example 16

| Methyl Ester of Rosin | 43.54% |
|---|---|

-continued

| Hypermer LP-4 | 1.50% |
|---|---|
| Carbon Black | 0.41% |
| Titanium Dioxide White | 13.80% |
| Chrome Antimony Titanate | 40.75% |

The above gold coloring material was mixed on a high-speed disperser and passed over a three-roll mill. It was then molded in High Density Polyethylene at a 0.5% letdown ratio on a production injection molding machine. The part was free of the streaks which had been common with other coloring methods on the same tooling with the same colorant combination.

Example 17

| Refined Soya Oil | 16.26% |
|---|---|
| Methyl Ester of Rosin | 38.00% |
| Hypermer LP-4 | 1.72% |
| Hypermer LP-6 | 1.72% |
| Titanium Dioxide White | 21.94% |
| Carbon Black | 13.22% |
| Phthalocyanine Blue | 4.69% |
| Cadmium Sulfide/Selenide Red | 2.45% |

The above materials were mixed on a high-speed disperser and passed twice over a three-roll mill. The resulting product was then incorporated into a polyester fiber at letdowns ranging from 1 to 5.9%.

Comparative Example 18

| CR-834 Titanium Dioxide | 60% |
|---|---|
| H-1900 Polybutene | 19% |
| Mineral oil | 19% |
| Oleic acid | 2% |

Example A

Certain liquid concentrates prepared in the above examples are evaluated for viscosity/thixotropy by the procedure shown below.

The color concentrates prepared in Examples 4, 5 and 18 were measured on a Carri-Med cone and plate viscometer. The shear stress was increased gradually from 0 to about 25000 dynes/cm$^2$ value, and viscosity was recorded as a function of shear rate (sec$^{-1}$). It can be seen from FIG. 1 that Comparative Example 18 has an extremely high initial value (about 70,890 poise). It was, in fact, a gel—which did not f low when the container was held inverted. With increased shear, the Example 18 material dropped dramatically in viscosity, to a level of about 60 poise. Example 3 had only a slight initial drop in viscosity, then a gradual increase to about 160 poise. Example 4 also had only a slight initial drop in viscosity, then increased to about 850 poise.

Both Example 4 and Example 5, at 70% and 80% Titanium Dioxide respectively, flowed readily under gravity; and their initial viscosities were well below the Comparative Example 18 at 60% Titanium Dioxide.

Examples 7 and 8–75% Iron Oxide Red and 45.2% Quinacridone Red respectively—both flowed freely under gravity, then thickened under increasing shear.

Examples 9 and 10–50% Ultramarine Blue and 42.9% Carbon Black respectively—both flowed freely under gravity. The Ultramarine Blue was essentially Newtonian in behavior, while the Carbon Black displayed some dilatency.

Example 11—83.5% total solids—70% TiO$_2$, 13.5% CaCO$_3$ in a rosin vehicle showed relatively low viscosity and moderate dilatency.

Example B

A vehicle of 69.75% Hercoflex 500 and 29.75% Mineral oil, with 0.5% Solvent Red 111 incorporated as a visual tracer, was added to the following resins: High Density Polyethylene (HDPE), Homopolymer Polypropylene (HOMO.PP), Copolymer Polypropylene (COPOLY PP), Crystal Polystyrene (GPPS), High Impact Polystyrene (HIPS), and Polycarbonate—at a level of 4%. This is a level well above typical usage rates for pure vehicle. The polymer and vehicle were mixed by hand in a polyethylene bag, and injection molded into ⅛" tensile bars for tensile testing, and into square plaques for visual inspection and Gardner Impact tests.

There was no screw slippage observed in the above moldings; the samples showed no visual sign of nonuniformity or delamination. The physical test results were as follows:

TABLE 1

| Resin | W't % Vehicle | Yield Strength[1] | Gardner Impact[2] |
|---|---|---|---|
| HIPS | — | 4147(44) | 10(7) |
| HIPS | 4 | 3353(90) | 54(43) |
| Homo.PP | — | 4513(103) | 60(26) |
| Homo.PP | 4 | 4539(70) | 149(9) |
| COPOLY PP | — | 3385(63) | 175(78) |
| COPOLY PP | 4 | 3423(10) | 176(17) |
| HDPE | — | 3582(41) | 203(35) |
| HDPE | 4 | 3047(124) | 205(59) |
| Polycarbonate | — | 8955(157) | >320 |
| Polycarbonate | 4 | 9602(155) | >320 |
| GPPS | — | — | <2 |
| GPPS | 4 | — | <2 |

[1]PSI ASTM D 638, parenthetical number is standard deviation
[2]in-lbs (J) ASTM D 3029 parenthetical number is standard deviation While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A liquid concentrate comprising:
   (I) a rosin based vehicle comprising:
      (A) at least about 52 percent by weight of the vehicle of at least one non-polymeric organic rosin ester;
      (B) at least about 0.1 percent by weight of the total concentrate of at least one surfactant having a surfactant demand which is met by a concentration of no more than about 20 percent by weight of the total concentrate; and
   (II) up to about 85 percent by weight of the total concentrate of at least one colorant or additive, wherein said concentrate flows readily by gravity and is characterized by a viscosity at 25° C. under a shear stress of 12.5 thousand dynes/cm$^2$ of about 5 to about 1500 poise.

2. The concentrate according to claim 1 wherein said non-polymeric rosin ester is liquid at 25° C. or has a softening point from about 25° C. up to about 80° C.

3. The concentrate according to claim 1 wherein said non-polymeric rosin ester is a lower alkyl ester of rosin.

4. The concentrate according to claim 1 wherein said rosin based vehicle is substantially free of water.

5. The concentrate according to claim 4 wherein said rosin based vehicle contains less than about 0.1 percent by weight of the total concentrate of water.

6. A liquid concentrate prepared by a process that comprises:
   (1) blending a rosin based vehicle comprising (A) at least about 52 percent by weight of the vehicle of at least one non-polymeric organic rosin ester with (B) at least about 0.1% by weight of the total concentrate of at least one surfactant, to obtain vehicle (I); and
   (2) mixing (II) up to about 85 percent by weight of the concentrate of at least one colorant or additive with said vehicle (I) to obtain said concentrate.

7. The concentrate of claim 1 wherein said vehicle further comprises a low viscosity organic diluent.

8. The concentrate of claims 7 wherein said diluent comprises a mineral oil.

* * * * *